(12) United States Patent
Iyasu et al.

(10) Patent No.: US 9,236,760 B2
(45) Date of Patent: Jan. 12, 2016

(54) CHARGING DEVICE FOR ELECTROMOTIVE VEHICLE

(75) Inventors: Seiji Iyasu, Anjo (JP); Toru Wakimoto, Chiryu (JP); Kenji Itagaki, Okazaki (JP); Yoshinobu Sugiyama, Toyota (JP)

(73) Assignees: TOYOTA JIDOSHA KABUSHIKI KAISHA, Toyota (JP); NIPPON SOKEN, INC., Nishio (JP)

( * ) Notice: Subject to any disclaimer, the term of this patent is extended or adjusted under 35 U.S.C. 154(b) by 411 days.

(21) Appl. No.: 13/805,135

(22) PCT Filed: Jul. 4, 2011

(86) PCT No.: PCT/IB2011/001555
§ 371 (c)(1),
(2), (4) Date: Dec. 18, 2012

(87) PCT Pub. No.: WO2012/004647
PCT Pub. Date: Jan. 12, 2012

(65) Prior Publication Data
US 2013/0093394 A1    Apr. 18, 2013

(30) Foreign Application Priority Data
Jul. 5, 2010    (JP) .................................. 2010-152945

(51) Int. Cl.
*H02J 7/04*      (2006.01)
*B60L 11/18*     (2006.01)
*H02M 3/155*     (2006.01)

(52) U.S. Cl.
CPC ............... *H02J 7/04* (2013.01); *B60L 11/1811* (2013.01); *H02M 3/155* (2013.01); *B60L 2210/10* (2013.01); *B60L 2210/30* (2013.01); *Y02T 10/7005* (2013.01); *Y02T 10/7216* (2013.01); *Y02T 10/7241* (2013.01); *Y02T 90/127* (2013.01); *Y02T 90/14* (2013.01)

(58) Field of Classification Search
CPC ............ B60L 11/1811; B60L 2210/10; B60L 2210/30; H02M 3/155; H02J 7/04; Y02T 10/7005; Y02T 10/7216; Y02T 10/7241; Y02T 90/127; Y02T 90/14
See application file for complete search history.

(56) References Cited

U.S. PATENT DOCUMENTS 7,203,048 B2 *  4/2007  Shyr et al. .................... 361/93.9
7,542,257 B2 *  6/2009  McCormick et al. ........ 361/91.1

(Continued)

FOREIGN PATENT DOCUMENTS

EP    1662641 A2   5/2006
EP    2 178 189 A1   4/2010

(Continued)

*Primary Examiner* — Naum B Levin
(74) *Attorney, Agent, or Firm* — Oliff PLC (57) ABSTRACT

An AC-DC converter converts an alternating-current voltage, supplied from an external power supply, to a direct-current voltage higher than a peak voltage of the alternating-current voltage, and outputs the direct-current voltage to a first power supply line. In a normal control mode, a DC-DC converter steps down a voltage of the power supply line through on/off control over a switching element to charge a main battery. On the other hand, in an upper arm ON control mode, the DC-DC converter charge the main battery while the switching element is kept in an on state. On the basis of a state of external charging, a control device applies the upper arm ON control mode when a condition that upper arm ON control is applicable is satisfied, and applies the normal control mode when the condition is not satisfied.

7 Claims, 9 Drawing Sheets

(56) References Cited

U.S. PATENT DOCUMENTS

| | | | |
|---|---|---|---|
| 7,602,167 B2 * | 10/2009 | Trafton et al. | 323/284 |
| 7,737,658 B2 * | 6/2010 | Sennami et al. | 320/128 |
| 8,091,663 B2 * | 1/2012 | Ichikawa | 180/65.265 |
| 8,103,386 B2 * | 1/2012 | Ichikawa et al. | 700/286 |
| 8,256,547 B2 * | 9/2012 | Ichikawa | 180/65.29 |
| 8,297,391 B2 * | 10/2012 | Oyobe et al. | 180/65.275 |
| 2006/0245219 A1 | 11/2006 | Li | |
| 2007/0139010 A1 * | 6/2007 | Bonneau et al. | 320/125 |
| 2009/0033304 A1 | 2/2009 | Benedict | |
| 2009/0067205 A1 | 3/2009 | Oyobe et al. | |
| 2010/0181829 A1 | 7/2010 | Ichikawa et al. | |
| 2011/0156483 A1 * | 6/2011 | Caraghiorghiopol et al. | 307/66 |

FOREIGN PATENT DOCUMENTS

| | | |
|---|---|---|
| JP | 2007-318970 | 12/2007 |
| JP | 2009-033785 | 2/2009 |

\* cited by examiner

FIG. 11

CHARGING DEVICE FOR ELECTROMOTIVE VEHICLE

BACKGROUND OF THE INVENTION

1. Field of the Invention

The invention relates to a charging device for an electromotive vehicle and, more particularly, to charging control for charging an electrical storage device, equipped for an electromotive vehicle, by a power supply outside the vehicle.

2. Description of Related Art

An electric vehicle, a hybrid vehicle, a fuel cell vehicle, and the like, are known as electromotive vehicles that are configured to be able to generate vehicle driving force using electric power from an in-vehicle electrical storage device, typically, a secondary battery. There has been suggested an electromotive vehicle that is configured to charge an in-vehicle electrical storage device by a power supply outside the vehicle (hereinafter, also simply referred to as "external power supply"). Hereinafter, charging the electrical storage device by the external power supply is also simply referred to as "external charging".

Japanese Patent Application Publication No. 2007-318970 (JP-A-2007-318970) describes that a charging device that converts electric power, supplied from an external power supply, to electric power for charging an electrical storage device is formed of two alternating-current motors equipped for a hybrid vehicle and inverters and step-up converter for driving these alternating-current motors. The charging device described in JP-A-2007-318970 is configured to receive electric power from the external power supply via respective neutral points of the two alternating-current motors.

In addition, Japanese Patent Application Publication No. 2009-33785 (JP-A-2009-33785) describes charging control in a power supply system of an electromotive vehicle, in which a plurality of pairs of electrical storage device and converter are arranged in parallel with each other. Specifically, JP-A-2009-33785 describes control for charging each electrical storage device by keeping an upper arm element of a corresponding step-up chopper DC-DC converter circuit (converter) in an on state.

In the charging device described in JP-A-2007-318970, when electric power supplied from the external power supply is converted to electric power for charging the electrical storage device, there is a limit for increasing the charging efficiency because of a power loss in switching elements resulting from DC-DC conversion operation or an iron loss and copper loss of a smoothing inductor.

JP-A-2009-33785 describes that the electrical storage device is charged with the increased efficiency of each chopper DC-DC converter circuit in such a manner that the upper arm element of any one of the DC-DC converter circuits is kept in an on state, but JP-A-2009-33785 does not specifically describe under what condition such charging control should be applied. However, depending on the state of external charging, when the upper arm element of any one of the DC-DC converter circuits is kept in an on state, there may occur a case where efficiency in elements other than the DC-DC converter circuit decreases or a case where excessive current occurs.

SUMMARY OF THE INVENTION

The invention provides an electrical storage device that is equipped for an electromotive vehicle and that may be charged with electric power from an external power supply with high efficiency.

An aspect of the invention relates to a charging device for an electromotive vehicle equipped with an electrical storage device. The charging device includes a first electric power converter, a second electric power converter, and a control device that is used to control the first and second electric power converters. The first electric power converter converts an alternating-current voltage, supplied from an external power supply, to a direct-current voltage higher than a peak voltage of the alternating-current voltage, and outputs the direct-current voltage to a first power supply line. The second electric power converter, during external charging for charging the electrical storage device by the external power supply, is used to convert a direct-current electric power between the first power supply line and a second power supply line that is electrically connected to a positive electrode of the electrical storage device. The second electric power converter includes a first switching element that is electrically connected between a first node and the first power supply line and a first inductor that is electrically connected between the first node and the second power supply line. During the external charging, the control device selects any one of a first control mode in which the electrical storage device is charged through on/off control over the first switching element and a second control mode in which the electrical storage device is charged while the first switching element is kept in an on state, on the basis of a state of the external charging.

The control device may select the second control mode when a voltage of the electrical storage device is higher than the peak voltage of the alternating-current voltage.

In addition, the control device may select the second control mode when a charging electric power for charging the electrical storage device is lower than a predetermined level.

Furthermore, the first electric power converter may include a rectifier, a second inductor, a first diode and a second switching element. The rectifier may rectify the alternating-current voltage supplied from the external power supply and then output the rectified voltage to a third power supply line. The second inductor may be electrically connected between the third power supply line and a second node. The first diode may be electrically connected between the second node and the first power supply line so that a direction from the second node to the first power supply line is set as a forward direction. The second switching element may be electrically connected between the second node and a fourth power supply line that is electrically connected to a negative electrode of the electrical storage device. The control device may control on/off states of the second switching element so that a current that passes through the second inductor coincides with a target current. The target current is an absolute value of an alternating current of which a phase coincides with a phase of the alternating-current voltage. Furthermore, the control device may control an amplitude of the target current on the basis of a voltage of the first power supply line in the first control mode, and may keep the amplitude of the target current constant irrespective of the voltage of the first power supply line in the second control mode.

In addition, in the first control mode, the control device may control a duty ratio of on/off states of the first switching element on the basis of a difference between a charging current for charging the electrical storage device and a target charging current.

Alternatively, when the state of the external charging satisfies a predetermined condition that the second control mode is applicable while the first control mode is selected, the control device may change from the first control mode to the second control mode after a voltage of the first power supply line has decreased to a voltage of the electrical storage device.

In the above described configuration, when the state of the external charging satisfies the predetermined condition, the control device may stop the first and second electric power converters and decrease the voltage of the first power supply line by discharging using a discharging resistor. Alternatively, when the state of the external charging satisfies the predetermined condition, the control device may decrease a target voltage of the voltage of the first power supply line, supplied to the second electric power converter, to the voltage of the electrical storage device.

According to the aspect of the invention, by appropriately applying charging control that keeps on/off states of a DC-DC conversion switching element on the basis of a state of external charging, it is possible to charge with high efficiency an electrical storage device equipped for an electromotive vehicle with electric power from an external power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. Note that like reference numerals denote the same or corresponding components in the drawings and the description thereof will not be repeated basically.

Figure 1:
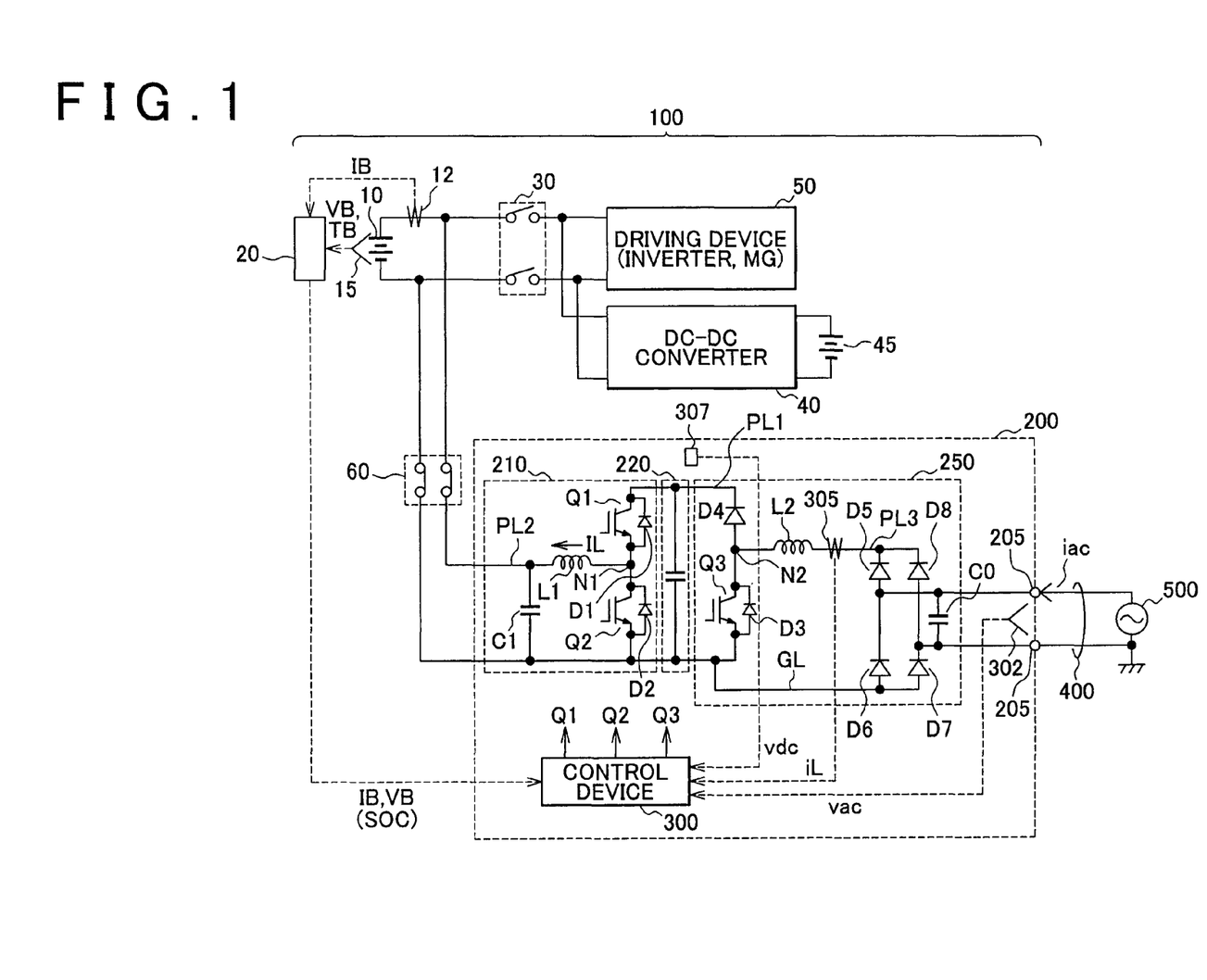
FIG. 1 is a circuit diagram for illustrating a configuration example of a charging device for an electromotive vehicle according to an embodiment.

FIG. 1 is a circuit diagram for illustrating a configuration example of a charging device for an electromotive vehicle according to the embodiment of the invention.

As shown in FIG. 1, an electromotive vehicle 100 includes a main battery 10, a current sensor 12, a battery sensor 15, a battery monitoring unit 20, a system main relay 30, a DC-DC converter 40, an auxiliary battery 45 and a driving device 50. As described above, the electromotive vehicle 100 is configured to be able to generate vehicle driving force using electric power from the main battery 10. The electromotive vehicle 100 includes an electric vehicle, a hybrid vehicle and a fuel cell vehicle.

The main battery 10 is illustrated as a typical example of an "electrical storage device". The main battery 10 is typically formed of a secondary battery, such as a lithium ion battery and a nickel metal hydride battery. For example, the output voltage of the main battery 10 is about 200 V. Alternatively, the "electrical storage device" may be, for example, formed of an electric double layer capacitor or may be formed of a combination of a secondary battery and a capacitor.

The current sensor 12 detects the output current (hereinafter, also referred to as battery current) IB of the main battery 10, and transmits the detected battery current IB to the battery monitoring unit 20. Hereinafter, the battery current IB during charging is indicated by positive value. The battery sensor 15 is attached to the main battery 10, and detects a battery voltage VB and a battery temperature TB. The battery voltage VB and the battery temperature TB detected by the battery sensor 15 are transmitted to the battery monitoring unit 20.

The battery monitoring unit 20 monitors the state of the main battery 10 on the basis of the battery current IB, the battery voltage VB and the battery temperature TB. Typically, the battery monitoring unit 20 calculates a state of charge (SOC) that is indicated by the ratio (0 to 100%) of a current amount of charge to a full charge capacity in the main battery 10. In addition, the battery monitoring unit 20 sets the charging electric power upper limit value and discharging electric power upper limit value of the main battery 10 on the basis of the state of the main battery 10.

The driving device 50 includes a motor generator (MG) (not shown) and an electric power converter (inverter/converter) (not shown). The motor generator (MG) is used to generate vehicle driving force using electric power from the main battery 10. The electric power converter (inverter/converter) is used to drive the motor generator. In addition, the motor generator (MG) operates as a generator that converts deceleration energy to electric energy during regenerative braking of the electromotive vehicle 100. Regenerated electric power is converted to electric power for charging the main battery 10 by the electric power converter (inverter/converter).

The system main relay 30 is connected in a current-carrying path between the main battery 10 and the driving device 50. The system main relay 30 is basically turned on while the vehicle is traveling; whereas the system main relay 30 is turned off during external charging. However, during external charging, when it is required to operate an auxiliary system, the system main relay 30 may be turned on through user's operation, or the like.

The DC-DC converter 40 is connected to the system main relay 30 in parallel with the driving device 50. The DC-DC converter 40 steps down the output voltage of the main battery 10 to the power supply voltage of the auxiliary system (for example, about 12 V). The DC-DC converter 40 is typically a switching regulator that includes semiconductor switching elements (not shown). A selected known circuit configuration may be applied to the DC-DC converter 40.

The auxiliary battery 45 is charged with the output voltage of the DC-DC converter 40. An auxiliary load (not shown) is connected to the auxiliary battery 45. The auxiliary load includes an audio device, compact motors, an electronic control unit (ECU), and the like, that operate on electric power supplied from the auxiliary battery 45.

When the system main relay 30 is turned on, the electric power of the main battery 10 is supplied to the driving device 50 and the DC-DC converter 40. On the other hand, when the system main relay 30 is turned off, the auxiliary system, including the DC-DC converter 40, and the driving device 50 are electrically isolated from the main battery 10.

Next, a configuration for external charging will be described in detail. The electromotive vehicle 100 further includes an external charging relay 60 and a charging device 200. The charging device 200 has an inlet 205 for external charging.

The external charging relay 60 is turned off while the electromotive vehicle 100 is traveling; whereas the external charging relay 60 is turned on during external charging. The inlet 205 is electrically connected to an external power supply 500 via a charging cable 400. The external power supply 500 is typically a commercial system power supply.

The charging device 200 converts alternating-current electric power, supplied from the external power supply 500, to direct-current electric power for charging the main battery 10.

The charging device 200 includes a DC-DC converter 210, a smoothing capacitor 220, an AC-DC converter 250, a control device 300, voltage sensors 302 and 307 and a current sensor 305.

The control device 300 is formed of an electronic control unit (ECU) that incorporates a central processing unit (CPU) (not shown) and a memory. The control device 300 is configured to execute operations using values detected by the sensors on the basis of maps and programs stored in the memory. Alternatively, at least part of the ECU may be configured to execute predetermined numerical/logical operations by hardware, such as an electronic circuit.

The voltage sensor 302 detects an alternating-current voltage vac input from the external power supply 500 via the inlet 205.

The AC-DC converter 250 is formed of a non-isolated electric power converter. The AC-DC converter 250 converts the alternating-current voltage vac (hereinafter, also referred to as power supply voltage vac), supplied from the external power supply 500, to direct-current voltage and then outputs the direct-current voltage to a power supply line PL1. The smoothing capacitor 220 is electrically connected between the power supply line PL1 and a ground line GL. The voltage sensor 307 detects the voltage of the power supply line PL1, that is, the direct-current voltage vdc of the smoothing capacitor 220.

The DC-DC converter 210 is formed of a non-isolated electric power converter, and converts direct-current electric power between the power supply line PL1 and a power supply line PL2. The power supply line PL2 is electrically connected to the positive electrode of the main battery 10 when the external charging relay 60 is turned on. Similarly, the ground line GL is electrically connected to the negative electrode of the main battery 10 when the external charging relay 60 is turned on.

The DC-DC converter 210 has a so-called step-up chopper configuration. Specifically, the DC-DC converter 210 includes power semiconductor switching elements Q1 and Q2, an inductor L1 and a capacitor C1. Each power semiconductor switching element (hereinafter, also simply referred to as "switching element") may be an insulated gate bipolar transistor (IGBT), a power metal oxide semiconductor (MOS) transistor, a power bipolar transistor, or the like. Antiparallel diodes D1 and D2 are respectively connected to the switching elements Q1 and Q2.

The switching element Q1 is electrically connected between the power supply line PL1 and a node N1. The switching element Q2 is electrically connected between the node N1 and the ground line GL. The on/off states of each of the switching elements Q1 and Q2 are controlled by a control signal from the control device 300.

The inductor L1 is electrically connected between the node N1 and the power supply line PL2. Hereinafter, the passing current of the inductor L1 is referred to as current IL. The capacitor C1 is connected between the power supply line PL2 and the ground line GL. The capacitor C1 removes a high-frequency component included in the current IL.

It may be considered that the DC-DC converter 210 corresponds to a "second electric power converter", the switching element Q1 corresponds to a "first switching element" and the inductor L1 corresponds to a "first inductor".

The AC-DC converter 250 includes a capacitor C0, an inductor L2, a switching element Q3, an antiparallel diode D3, a diode D4 and diodes D5 to D8. The diodes D5 to D8 constitute a diode bridge.

The capacitor C0 removes the high-frequency component of a power supply current iac supplied from the external power supply 500. The diodes D5 to D8 constitute the diode bridge, rectify the power supply voltage vac supplied from the external power supply 500, and outputs the rectified power supply voltage vac to a power supply line PL3. The inductor L2 is electrically connected between the power supply line PL3 and the node N2. The current sensor 305 detects the passing current iL of the inductor L2.

The switching element Q3 is electrically connected between the node N2 and the ground line GL. The antiparallel diode D3 is connected to the switching element Q3. The diode D4 is connected between the node N2 and the power supply line PL1 so that the direction from the node N2 toward the power supply line PL1 is set as a forward direction.

It may be considered that the AC-DC converter 250 corresponds to a "first electric power converter". It may be considered that the switching element Q3 corresponds to a "second switching element" and the diode D4 corresponds to a "first diode". In addition, it may be considered that the diode bridge formed of the diodes D5 to D8 corresponds to a "rectifier".

The control device 300 controls external charging using the AC-DC converter 250 and the DC-DC converter 210 on the basis of the battery current IB and the battery voltage VB (or/and the SOC) from the battery monitoring unit 20, the power supply voltage vac from the voltage sensor 302, the current iL from the current sensor 305 and the direct-current voltage vdc from the voltage sensor 307. Specifically, the control device 300 acquires the state of external charging through the above described voltages and currents, and generates control signals for the switching elements Q1 to Q3 so as to appropriately control external charging of the main battery 10.

Figure 2:
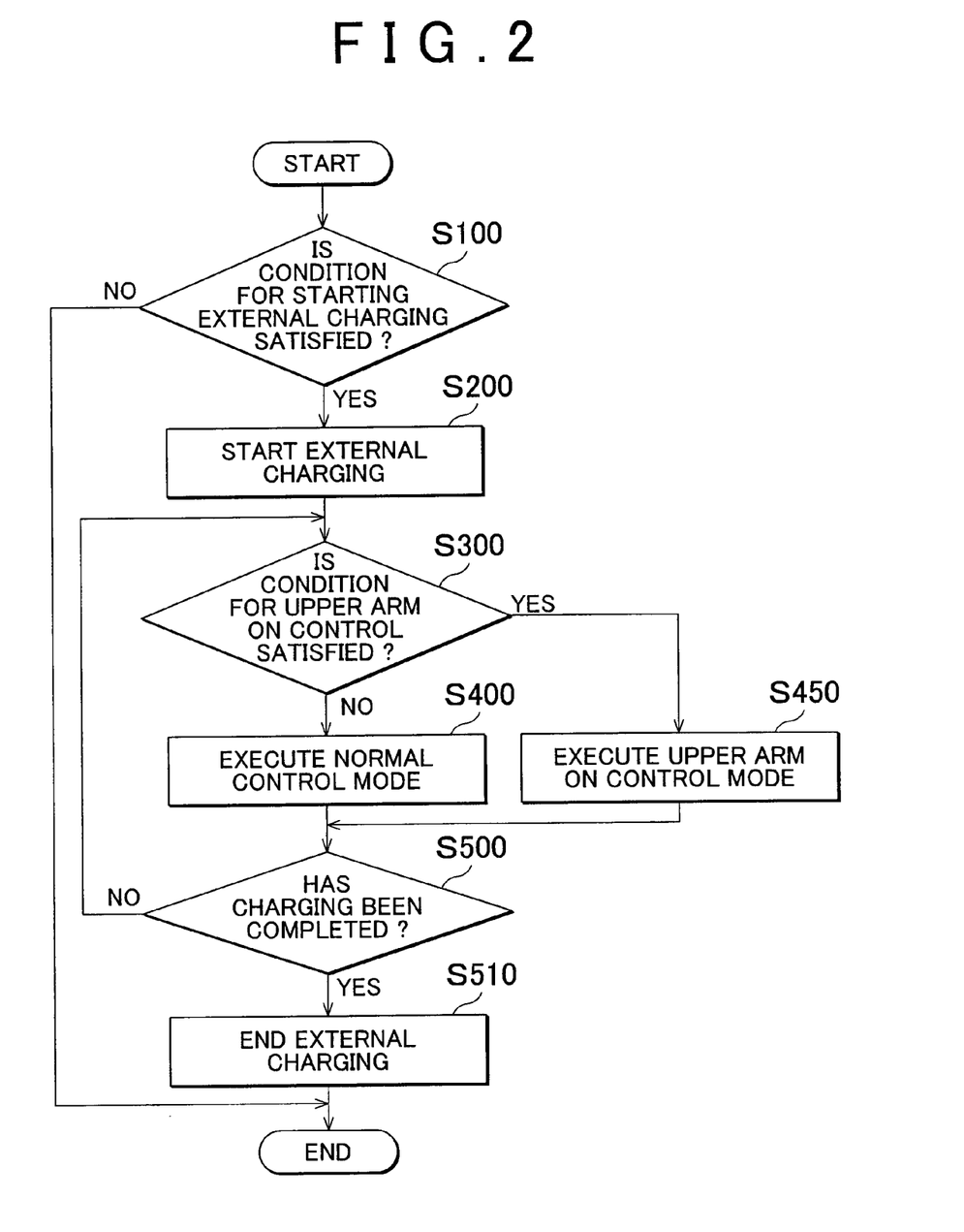
FIG. 2 is a flowchart that illustrates external charging control executed by the charging device for an electromotive vehicle according to the embodiment.

FIG. 2 is a flowchart that illustrates external charging control executed by the charging device for an electromotive vehicle according to the embodiment.

As shown in FIG. 2, the control device 300 determines in step S100 whether a condition for starting external charging is satisfied. For example, when the charging cable 400 is properly connected to the inlet 205 and external charging is instructed by user's instructions, or the like, affirmative determination is made in step S100.

When the condition for starting external charging is satisfied (YES in S100), the control device 300 starts external charging in step S200. In step S200, for example, the external charging relay 60 is turned on.

During external charging, the control device 300 determines in step S300 whether a condition that upper arm ON control, which will be described in detail later, is applicable is satisfied on the basis of the state of external charging. Then, when the condition is not satisfied (negative determination is made in S300), the control device 300 proceeds with the process to step S400, and then controls the charging device 200 in a normal control mode. On the other hand, when the condition is satisfied (affirmative determination is made in S300), the control device 300 proceeds with the process to step S450, and then controls the charging device 200 in an upper arm ON control mode. The control device 300 determines in step S500 whether the charging of the main battery 10 through external charging, to which the normal control mode (S400) or the upper arm ON control mode (S450) is applied, has been completed. For example, when the SOC of the main battery 10 has reached a predetermined level or when the charging end time specified by the user has come, affirmative determination is made in step S500.

Until completion of charging (while negative determination is made in S500), the control device 300 repeats the processes of steps S300 to S500 to continue external charging of the main battery 10. On the other hand, when charging has been completed (when affirmative determination is made in S500), the control device 300 proceeds with the process to step S510 and then ends external charging. In step S510, for example, the external charging relay 60 is turned off.

In this way, in the charging device for an electromotive vehicle according to the present embodiment, normal control or upper arm ON control is selectively applied on the basis of the state of external charging. Next, the details of normal control and upper arm ON control will be described.

Figure 3:
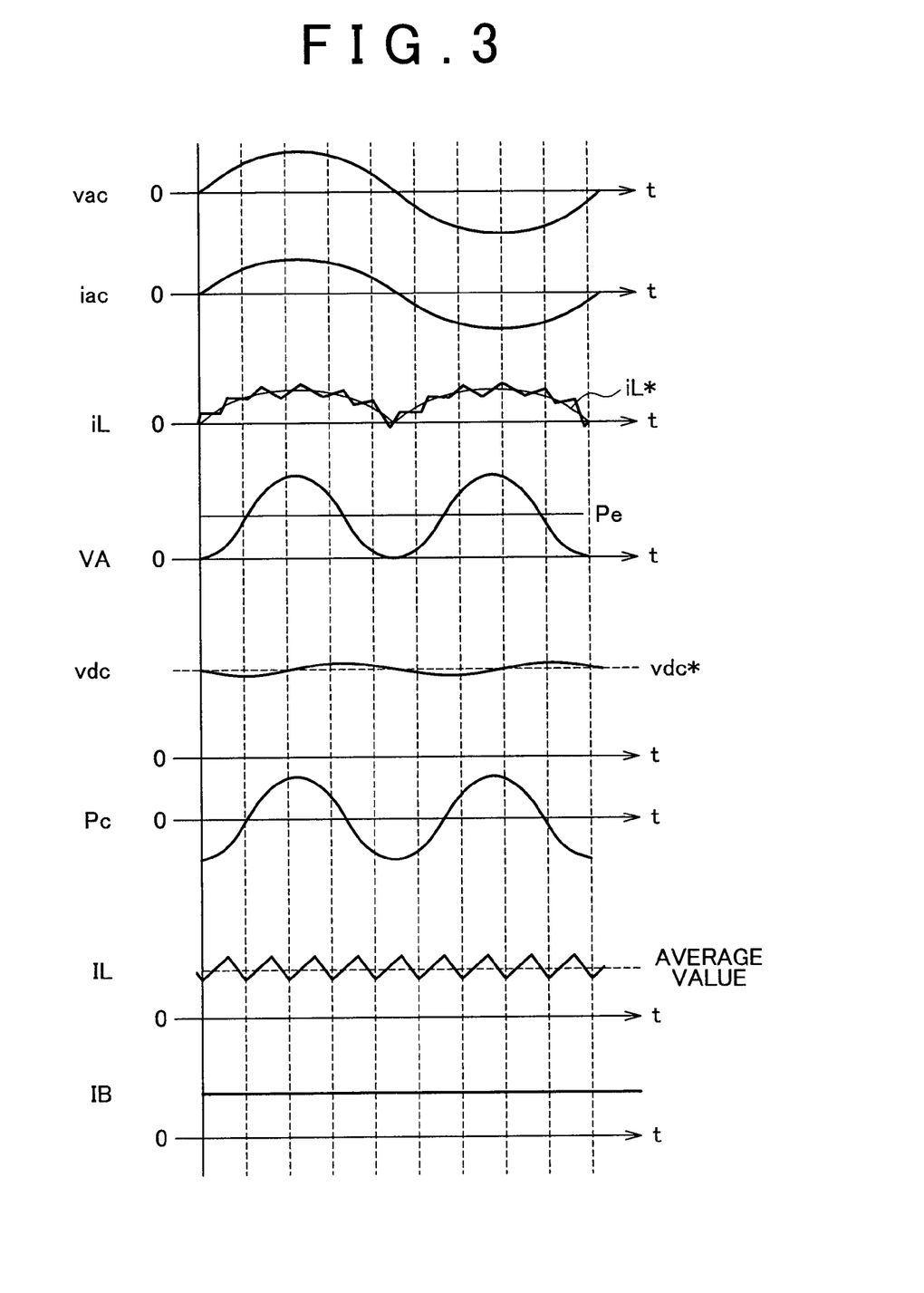
FIG. 3 is a first waveform chart for illustrating external charging operation in a normal control mode.

FIG. 3 is a waveform chart for illustrating the operation of the charging device 200 in the normal control mode.

As shown in FIG. 3, the power supply voltage vac supplied from the external power supply 500 is an alternating-current voltage of a predetermined frequency (hereinafter, referred to as "power supply frequency"). In the AC-DC converter 250, the current iL of the inductor L2 increases during an on period of the switching element Q3; whereas the current iL of the inductor L2 reduces during an off period of the switching element Q3. Through on/off control over the switching element Q3, the current iL of the inductor L2 may be brought into coincidence with a target current iL*. Furthermore, direct current supplied to the power supply line PL1 via the diode D4 may be controlled on the basis of the magnitude of the target current iL*. That is, the AC-DC converter 250 controls AC-DC conversion from the power supply voltage vac, supplied from the external power supply 500, to the direct-current voltage vdc of the power supply line PL1.

Here, when the target current iL* is set to the absolute value of alternating current having the same phase as the power supply voltage vac, the power supply current iac and the power supply voltage vac have the same phase, so the power factor of electric power supplied from the external power supply 500 may be approximated to 1. By so doing, an instantaneous electric power VA expressed by the product of the power supply current iac and the power supply voltage vac is constantly a positive value, so an effective electric power Pe that is the average value of the instantaneous electric power VA increases. That is, the AC-DC converter 250 is able to not only carry out AC-DC conversion but also operate as a power factor correction (PFC) circuit.

The smoothing capacitor 220 is charged with current supplied from the AC-DC converter 250 via the diode D4. In addition, current discharged from the smoothing capacitor 220 is supplied to the main battery 10 via the DC-DC converter 210 to charge the main battery 10.

Through these charging and discharging, the voltage of the smoothing capacitor 220, that is, the direct-current voltage vdc, fluctuates at a frequency that is twice as high as the power supply frequency. The electric power Pc charged into or discharged from the smoothing capacitor 220 fluctuates at a frequency that is twice as high as the power supply frequency, as in the case of the direct-current voltage vdc.

Note that, as will be described in detail later, the magnitude (amplitude) of the target current iL* in the AC-DC converter 250 is controlled so as to bring the direct-current voltage vdc into coincidence with a target voltage vdc*. The target voltage vdc* during external charging is set so as to be at least higher than the peak value of the power supply voltage vac (for example, about 300 to 400 V).

Figure 4:
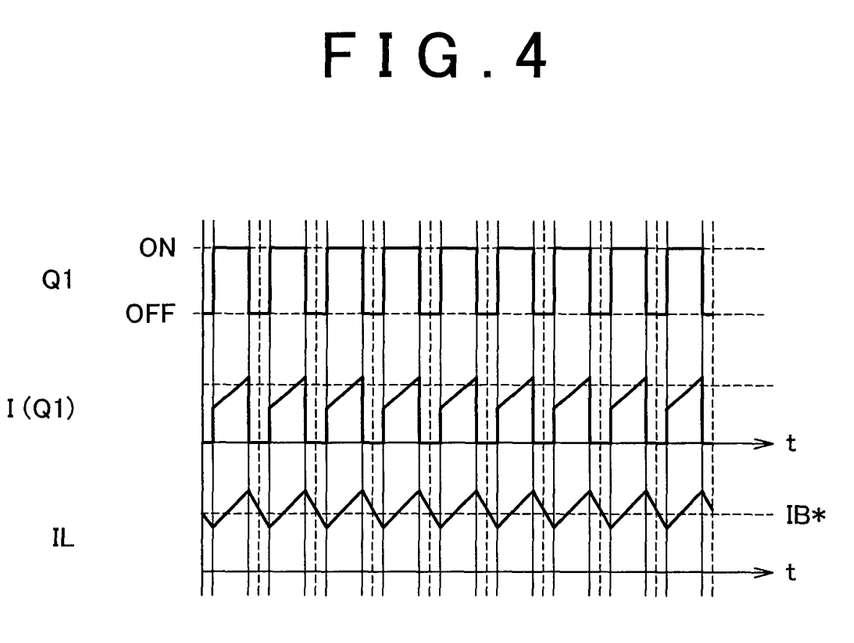
FIG. 4 is a second waveform chart for illustrating external charging operation in the normal control mode.

As shown in FIG. 4, the DC-DC converter 210 controls the current IL and, by extension, the battery current IB through on/off control over the switching element Q1. Note that, in the DC-DC converter 210, the switching elements Q1 and Q2 are turned on or off complementarily. That is, the switching element Q2 is turned off during an on period of the switching element Q1, and the switching element Q2 is turned on during an off period of the switching element Q1.

As shown in FIG. 4, the current IL increases during an on period of the switching element Q1, and the current IL decreases during an off period of the switching element Q1. Thus, the average value of the current IL may be controlled by the duty ratio of the switching element Q1.

Referring back to FIG. 3, the main battery 10 is charged with the battery current IB that is obtained in such a manner that a ripple component is removed by the capacitor C1 from the current IL controlled by the DC-DC converter 210. The battery current IB corresponds to the average value of the current IL. The DC-DC converter 210 controls the duty ratio of the switching element Q1 so as to bring the current IL into coincidence with a target charging current IB*.

Referring back to FIG. 1, the DC-DC converter 210 does not necessarily include the switching element Q2 in order to handle current control only in one direction to charge the main battery 10 from the external power supply 500. That is, only the diode D2 just needs to be present in the lower arm. However, by providing the switching element Q2, the output voltage of the main battery 10 may be increased to charge the smoothing capacitor 220. That is, the flexibility of control over external charging (particularly, at the time of a start of charging) improves.

As shown in FIG. 3 and FIG. 4, in the normal control mode, the AC-DC converter 250 converts the power supply voltage vac from the external power supply 500 to the direct-current voltage (vdc) higher than the peak value of the power supply voltage vac, and then outputs the direct-current voltage (vdc) to the power supply line PL1. Then, the DC-DC converter 210 adjusts the battery current IB of the main battery 10 to the target charging current IB* in such a manner that direct-current electric power between the power supply lines PL1 and PL2 is converted through on/off control over the switching element Q1.

Next, the operation of the charging device 200 during upper arm ON control will be described with reference to FIG. 5 and FIG. 6.

Figure 5:
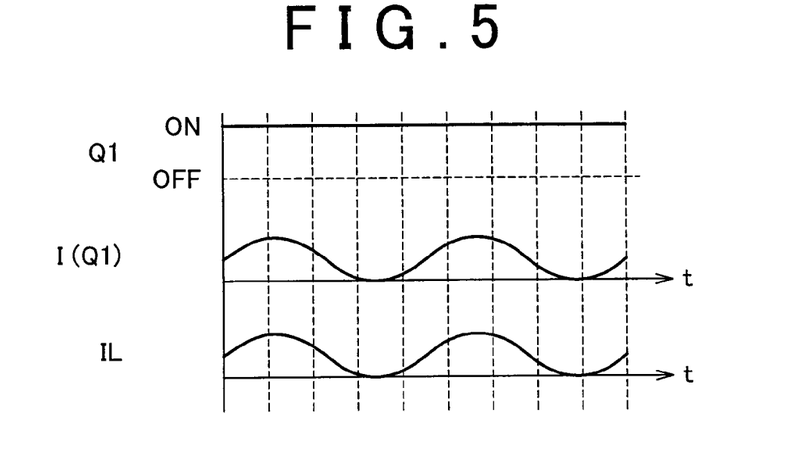
FIG. 5 is a first waveform chart for illustrating external charging operation in an upper arm ON control mode.

As shown in FIG. 5, in the upper arm ON control mode, the DC-DC converter 210 keeps the switching element Q1 in an on state. On the other hand, the switching element Q2 is kept in an off state. Thus, the power supply lines PL1 and PL2 are constantly electrically connected.

As a result, current and voltage are not controlled in the DC-DC converter 210, and the current I(Q1) that passes through the switching element Q1 and the current IL of the inductor L1 each include a fluctuating component of a frequency that is twice as high as the power supply frequency. The fluctuating component is generated when AC-DC conversion is performed in the AC-DC converter 250.

Figure 6:
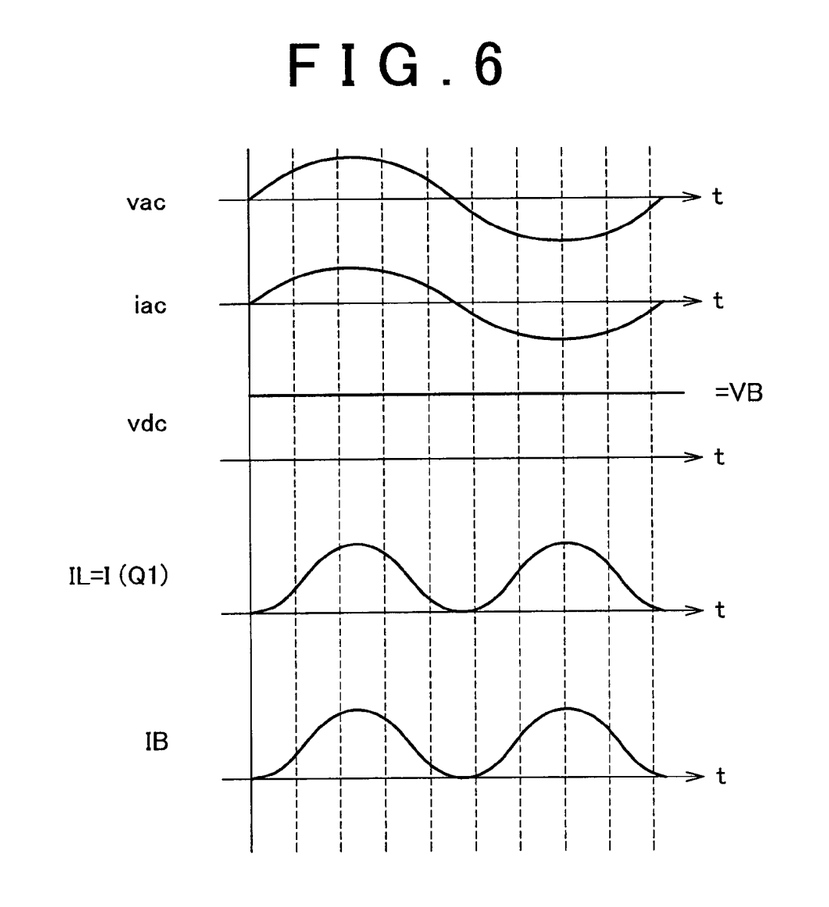
FIG. 6 is a second waveform chart for illustrating external charging operation in the upper arm ON control mode.

As shown in FIG. 6, the AC-DC converter 250 operates as in the case of the normal control mode, and converts the power supply voltage vac, supplied from the external power supply 500, to the direct-current voltage (vdc) that is higher than the peak value of the power supply voltage vac.

In the upper arm ON control mode, the main battery 10 is connected to the smoothing capacitor 220 via the switching element Q1 that is kept in an on state, so the direct-current voltage vdc is equal to the battery voltage VB. Then, the smoothing capacitor 220 does not function as an electric power buffer, but the current supplied from the AC-DC converter 250 directly becomes the battery current IB for charging the main battery 10. Thus, in the AC-DC converter 250, the magnitude (amplitude) of the target current iL* (FIG. 3) is not controlled on the basis of the direct-current voltage vdc but is set as a constant corresponding to the target charging current IB*.

Current supplied from the AC-DC converter 250 to the power supply line PL1 includes a ripple component of a frequency that is twice as high as the power supply frequency, as in the case of the normal control mode. The ripple component is directly superimposed on the current IL of the DC-DC converter 210, the current I(Q1) of the switching element Q1 shown in FIG. 5 and the battery current IB of the main battery 10.

Figure 7:
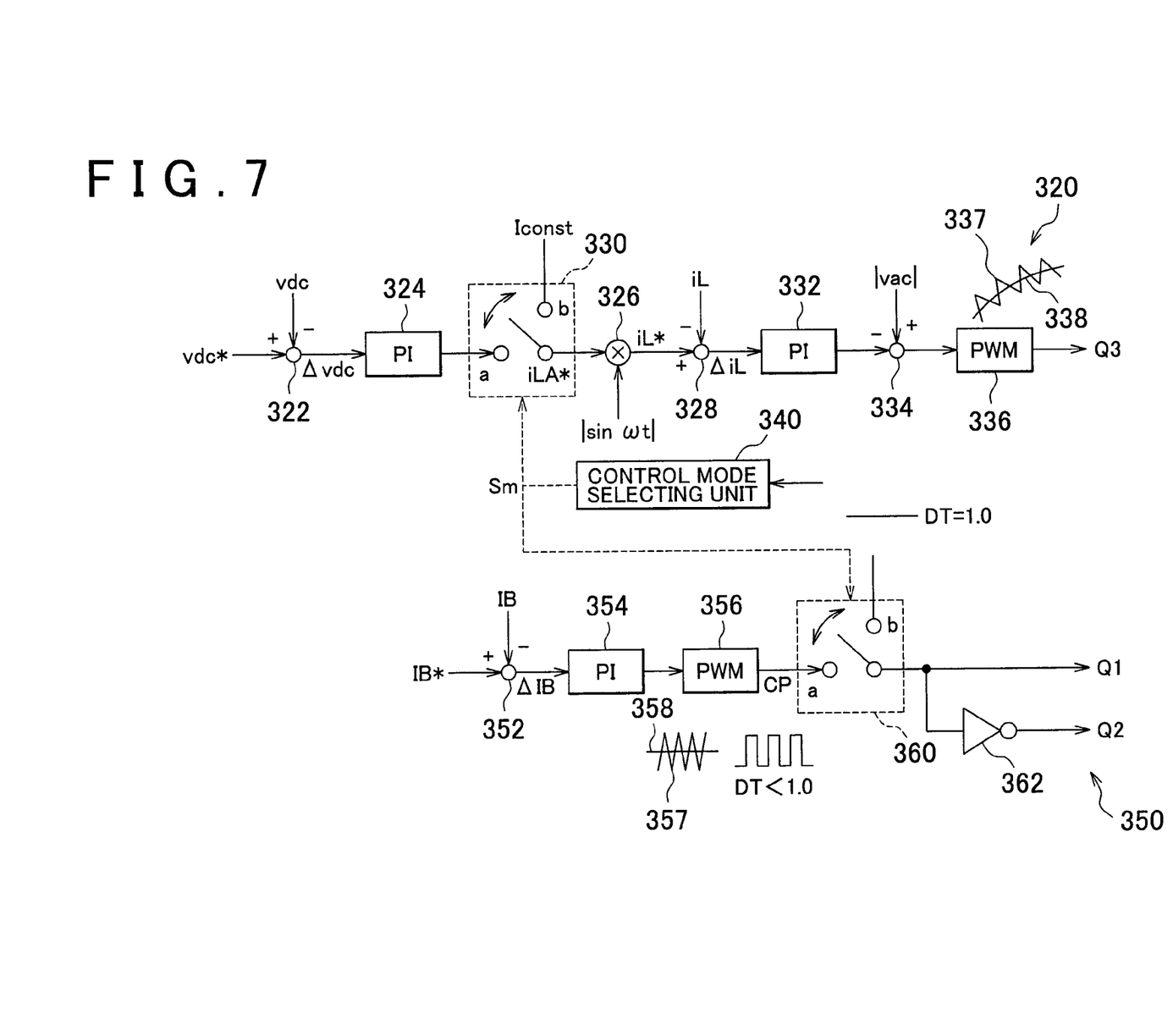
FIG. 7 is a functional block diagram for illustrating the control configuration of external charging control executed by the charging device for an electromotive vehicle according to the embodiment.

FIG. 7 is a block diagram for illustrating the control configuration of external charging control. Note that the functional blocks shown in FIG. 7 may be formed of a circuit (hardware) that has functions corresponding to the blocks or may be implemented in such a manner that the ECU executes software processing in accordance with preset programs.

As shown in FIG. 7, the control device 300 includes a control unit 320 for controlling the AC-DC converter 250, a control mode selecting unit 340 and a control unit 350 for controlling the DC-DC converter 210.

The control unit 320 includes subtraction units 322, 328 and 334, PI operation units 324 and 332, a control switch 330, a multiplication unit 326 and a PWM control unit 336.

The subtraction unit 322 subtracts the direct-current voltage vdc detected by the voltage sensor 307 from the target voltage vdc* of the direct-current voltage vdc. The PI operation unit 324 executes proportional integral operation based on a voltage difference $\Delta$vdc computed by the subtraction unit 322. It may be considered that a control operation value derived from the PI operation unit 324 corresponds to a feedback operation value for bringing the direct-current voltage vdc into coincidence with the target voltage vdc*.

The control switch 330 is controlled in accordance with a control signal Sm from the control mode selecting unit 340. When the normal control mode is instructed by the control signal Sm, the control switch 330 is controlled to the "a" side and sets a control operation value, derived from the PI operation unit 324, to a target current amplitude iLA*. On the other hand, when the upper arm ON control mode is instructed by the control signal Sm, the control switch 330 is controlled to the "b" side and sets a constant Iconst, which is determined in correspondence with the target charging current IB* and is not dependent on feedback operation, to the target current amplitude iLA*.

The multiplication unit 326 multiplies the target current amplitude iLA*, selected by the control switch 330, by a sine function $|\sin \omega t|$ to calculate the target current iL*. $\omega$ corresponds to the power supply frequency of the external power supply 500.

The subtraction unit 328 computes a current difference $\Delta$iL between the target current iL* calculated by the multiplication unit 326 and the current iL detected by the current sensor 305. The PI operation unit 332 executes proportional integral operation based on the current difference $\Delta$iL computed by the subtraction unit 328. The subtraction unit 334 subtracts the control operation value, derived from the PI operation unit 332, from the absolute value 'vac' of the power supply voltage to set a control command value.

The PWM control unit 336 generates an on/off control signal for the switching element Q3 on the basis of a comparison between a carrier signal 337 of a predetermined frequency and the control command value 338 from the subtraction unit 334. Specifically, in accordance with general pulse width modulation (PWM) control, the switching element Q3 is turned on when the control command value 338 is higher than the voltage of the carrier signal 337; whereas the switching element Q3 is turned off when the control command value 338 is lower than the voltage of the carrier signal 337.

The control unit 350 includes a subtraction unit 352, a PI operation unit 354, a PWM control unit 356, a control switch 360 and a reverser 362.

The subtraction unit 352 subtracts the battery current IB from the target charging current IB* of the main battery 10. The PI operation unit 354 generates a control command value by proportional integral operation based on the current difference $\Delta$IB computed by the subtraction unit 352. It may be considered that the control command value generated by the PI operation unit 354 corresponds to a feedback operation value for bringing the battery current IB into coincidence with the target charging current IB*.

The PWM control unit 356 generates a control pulse CP on the basis of a comparison between a carrier signal 357 of a predetermined frequency and the control command value 358 from the PI operation unit 354. The control pulse CP is a pulse-like signal having a duty ratio DT of 0 to 1.0.

The control switch 360 is controlled in accordance with the control signal Sm from the control mode selecting unit 340. When the normal control mode is instructed by the control signal Sm, the control switch 360 is controlled to the "a" side, and outputs the control pulse CP, supplied from the PWM control unit 356, as an on/off control signal for the switching element Q1.

On the other hand, when the upper arm ON control mode is instructed by the control signal Sm, the control switch 360 is controlled to the "b" side. At this time, the control switch 360 outputs a signal that is kept at a logical high level (that is, DT=1.0) as an on/off control signal for the switching element Q1 in order to keep the switching element Q1 in an on state.

The reverser 362 inverts the logical level of the on/off control signal for the switching element Q1 to generate an on/off control signal for the switching element Q2.

The control mode selecting unit 340 determines whether upper arm ON control is applicable on the basis of the state of external charging of the main battery 10. When the condition that upper arm ON control is applicable is satisfied, the control mode selecting unit 340 generates the control signal Sm so as to select the upper arm ON control mode. On the other hand, when the condition that upper arm ON control is applicable is not satisfied, the control signal Sm is set so as to select the normal control mode.

For example, the control mode selecting unit 340 determines whether upper arm ON control is applicable on the basis of a comparison between the battery voltage VB and the peak value (amplitude value) of the power supply voltage vac from the external power supply 500.

In the upper arm ON control mode, the main battery 10 and the power supply line PL1 are kept connected by the switching element Q1, so the battery voltage VB is equal to the direct-current voltage vdc. Therefore, in the non-isolated AC-DC converter 250, when the battery voltage VB is lower than the peak value (amplitude value) of the power supply voltage vac, the power supply current iac from the external power supply 500 cannot be accurately controlled. As a result, there is a concern that current that flows through the charging device 200 and charging current (battery current IB) become excessive or the efficiency decreases because the power factor cannot be improved by the AC-DC converter 250.

Thus, when the battery voltage VB is higher than the peak value of the power supply voltage vac, the control mode selecting unit 340 determines that upper arm ON control is applicable, and selects the upper arm ON control mode. On the other hand, when the battery voltage VB is lower than the peak value of the power supply voltage vac, the control mode selecting unit 340 determines that upper arm ON control is not applicable, and selects the normal control mode.

Figure 8:
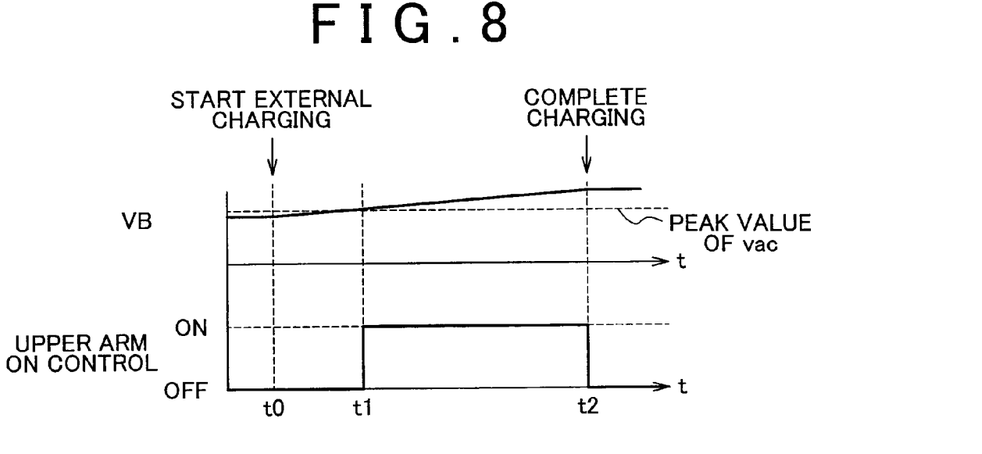
FIG. 8 is a first waveform chart for illustrating an example of a change from the normal control mode to the upper arm ON control mode.

FIG. 8 shows a first example of a change from the normal control mode to the upper arm ON control mode. As shown in FIG. 8, at time t0 at which external charging is started, the battery voltage VB is lower than the peak value of the power supply voltage vac. Therefore, upper arm ON control is not activated, and the main battery 10 is externally charged in the normal control mode.

Owing to external charging in the normal control mode, the battery voltage VB gradually increases. Then, at time t1, the battery voltage VB is higher than the peak value of the power supply voltage vac. As a result, upper arm ON control is activated, so, after time t1, the main battery 10 is externally charged in the upper arm ON control mode.

Then, at time t2, the charging of the main battery 10 is completed to end external charging.

By so doing, it is possible to apply upper arm ON control for increasing the efficiency of the DC-DC converter 210 while avoiding a charging state where there is a concern about excessive current or a decrease in power factor when upper arm ON control is applied. In addition, the AC-DC converter 250 is able to operate as a PFC circuit through the normal control mode and the upper arm ON control mode, so the efficiency of external charging increases.

Note that, at the time of the start of external charging (time t0), if the battery voltage VB is already higher than the peak value of the power supply voltage vac, it is possible to conduct external charging by applying only the upper arm ON control mode.

Alternatively, the control mode selecting unit 340 determines whether upper arm ON control is applicable on the basis of a charging electric power for charging the main battery 10 through external charging.

As shown in FIG. 5, in the upper arm ON control mode, ripple current of a frequency that is twice as high as the power supply frequency occurs in the passing current I(Q1) of the switching element 1. As a result, the peak value of the current I(Q1) increases, so, it is necessary to limit the application of the upper arm ON control only in a condition that the passing current I(Q1) falls within a range that does not exceed the current rating of the switching element Q1 even when such ripple current flows.

Figure 9:
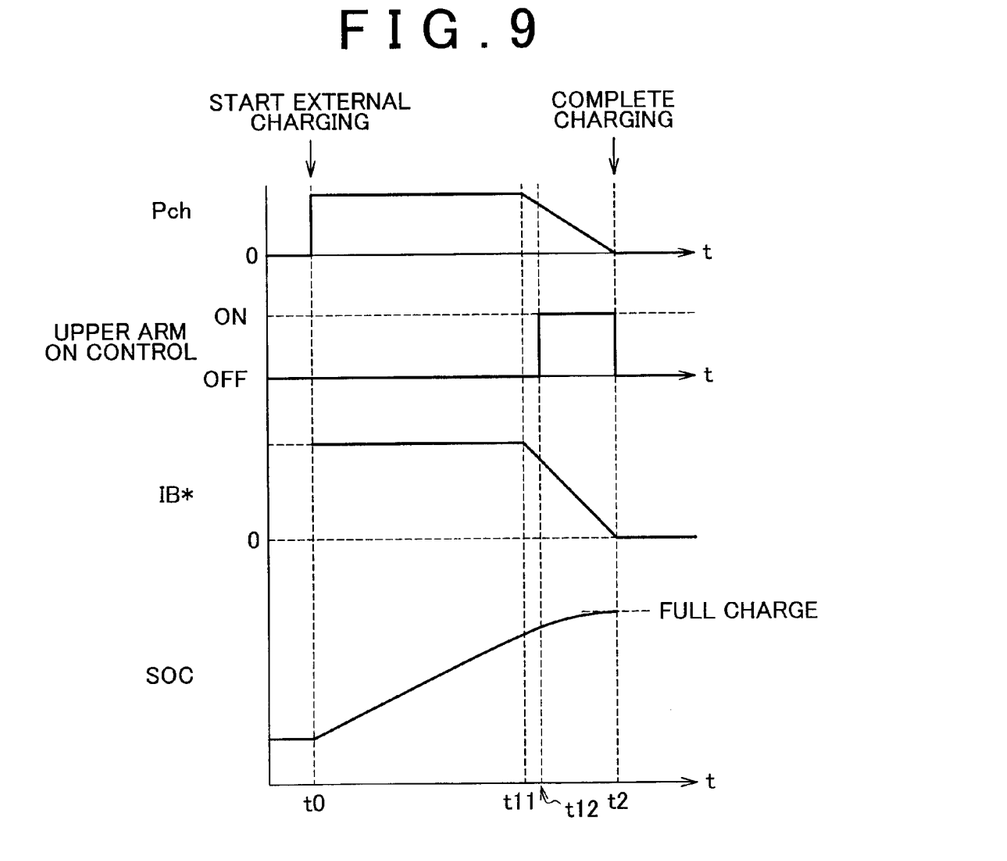
FIG. 9 is a second waveform chart for illustrating an example of a change from the normal control mode to the upper arm ON control mode.

FIG. 9 is a second example of a change from the normal control mode to the upper arm ON control mode. As shown in FIG. 9, at the time of the start of external charging (time t0), the target charging current IB* is set to a predetermined value in correspondence with a normal value of charging electric power Pch. At a normal charging electric power, upper arm ON control is not activated, and the normal control mode is applied.

Owing to external charging in the normal control mode, the SOC of the main battery 10 gradually increases. Then, when the SOC reaches a predetermined value and it is detected that charging has proceeded to a certain degree (time t11), the target charging current IB* is decreased so as to reduce the charging electric power Pch. Then, when the charging electric power Pch or the target charging current IB* decreases to a predetermined threshold (time t12), it is determined that the condition that upper arm ON control is applicable is satisfied. By so doing, after time t12, the main battery 10 is externally charged in the upper arm ON control mode.

In a state where the charging electric power Pch is low, that is, the target charging current IB* is low, a peak current is suppressed to a low value even when the upper arm ON control mode is applied and ripple current is superimposed on the current I(Q1) of the switching element Q1. In other words, it is possible to predetermine the threshold of the target charging current IB* (or the charging electric power Pch) for determining whether the upper arm ON control mode is applicable on the basis of the correlation among the peak value of the current I(Q1) that includes the ripple current at the time when upper arm ON control is applied, the target charging current IB* and the current rating of the switching element Q1.

Then, at time t2, the charging of the main battery 10 is completed to end external charging.

By so doing, it is possible to implement high-efficiency external charging to which upper arm ON control is applied while avoiding a charging state where there is a concern that excessive current flows through the switching element when upper arm ON control is applied.

Note that, in the charging device 200 that is able to handle the 200 VAC external power supply 500, when external charging is performed at an electric power lower than a rated value, such as when external charging is performed using the 100 VAC external power supply 500, it is possible to conduct external charging by applying only the upper arm ON control mode from the start of external charging (time t0) to the completion of charging (time t2).

In this way, with the charging device for an electromotive vehicle according to the present embodiment, it is possible to appropriately apply upper arm ON control on the basis of the state of external charging. That is, upper arm ON control is applied to prevent excessive current or a decrease in power factor, and then it is possible to implement high-efficiency external charging by applying upper arm ON control.

Next, preferred change control at the time of a change from the normal control mode to the upper arm ON control mode will be further described.

Figure 10:
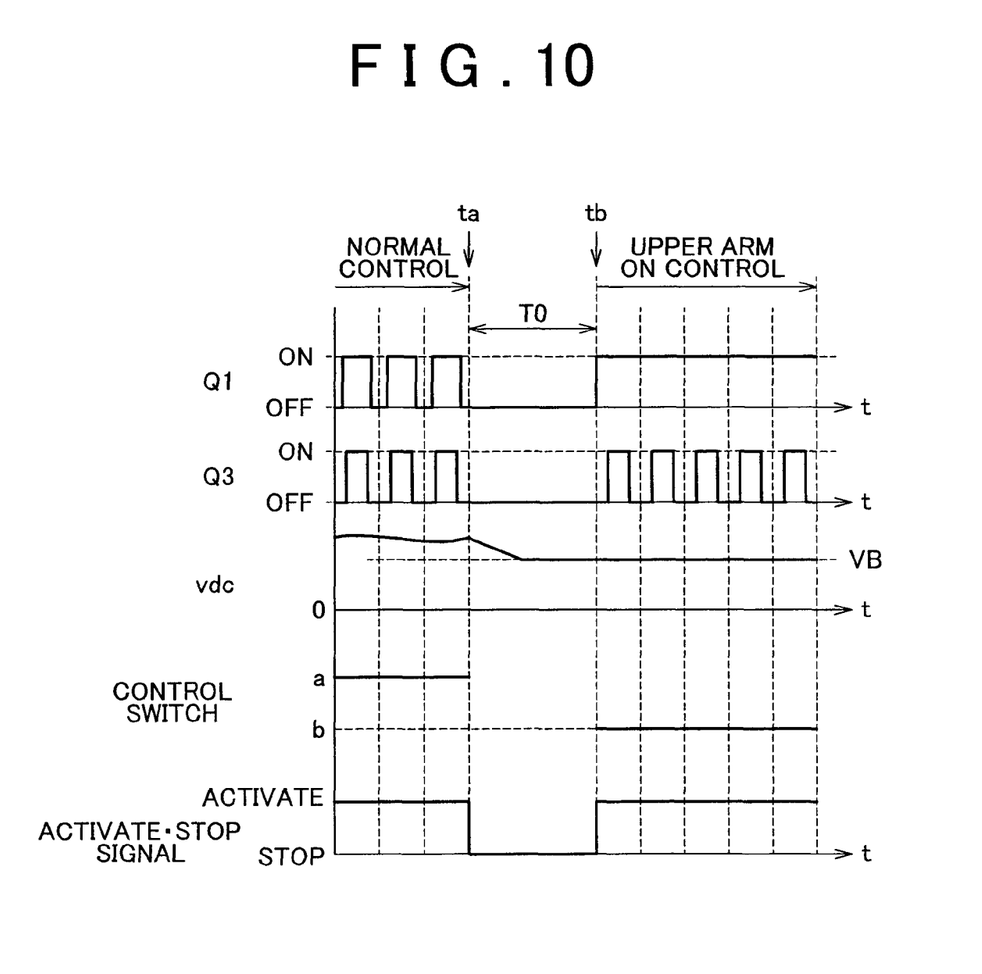
FIG. 10 is a waveform chart for illustrating a first example of control operation at the time of a change from the normal control mode to the upper arm ON control mode.

FIG. 10 shows a first waveform chart for illustrating control operation at the time of a change from normal control to upper arm ON control.

As shown in FIG. 10, until time ta, the condition that upper arm ON control is applicable, as illustrated in FIG. 8 or FIG. 9, is not satisfied, and the normal control mode is applied. Therefore, the control switches 330 and 360 shown in FIG. 7 each are connected to the "a" side.

As a result, the direct-current voltage vdc is controlled to the target voltage vdc* by on/off control over the switching element Q3 of the AC-DC converter 250. As described above, the target voltage vdc* is set in a range higher than the output voltage of the main battery 10. Then, the switching element Q1 of the DC-DC converter 210 is subjected to on/off control to thereby step down the direct-current voltage vdc and charge the main battery 10.

At time ta, when the condition that upper arm ON control is applicable is satisfied, a standby period T0 during which the AC-DC converter 250 and the DC-DC converter 210 are once stopped is provided. During the standby period T0, the smoothing capacitor 220 is discharged using a discharging resistor (not shown), so the direct-current voltage vdc gradually decreases. In the configuration of FIG. 1, the discharging resistor may be connected between the power supply line PL1 and the ground line GL in parallel with the smoothing capacitor 220.

During the standby period T0, the direct-current voltage vdc decreases to the battery voltage VB. After the direct-current voltage vdc has reached the battery voltage VB, current is supplied from the main battery 10 to the smoothing capacitor 220 via the diode D1, so the voltage of the main battery 10 and the voltage of the smoothing capacitor 220 are kept equal.

When the standby period T0 ends at time tb, the AC-DC converter 250 and the DC-DC converter 210 are activated again, and the upper arm ON control mode is applied. By so doing, the control switches 330 and 360 shown in FIG. 7 each are connected to the "b" side. In the DC-DC converter 210, the switching element Q1 is kept in an on state.

On the other hand, the AC-DC converter 250 generates charging current for charging the main battery 10 by converting the power supply voltage vac to direct-current voltage through on/off control over the switching element Q3.

By applying control for a change from the normal control mode to the upper arm ON control mode as shown in FIG. 10, inrush current that instantaneously occurs when the switching element Q1 is turned on may be suppressed at the time of a start of upper arm ON control. As a result, it is possible to further smoothly apply upper arm ON control.

Figure 11:
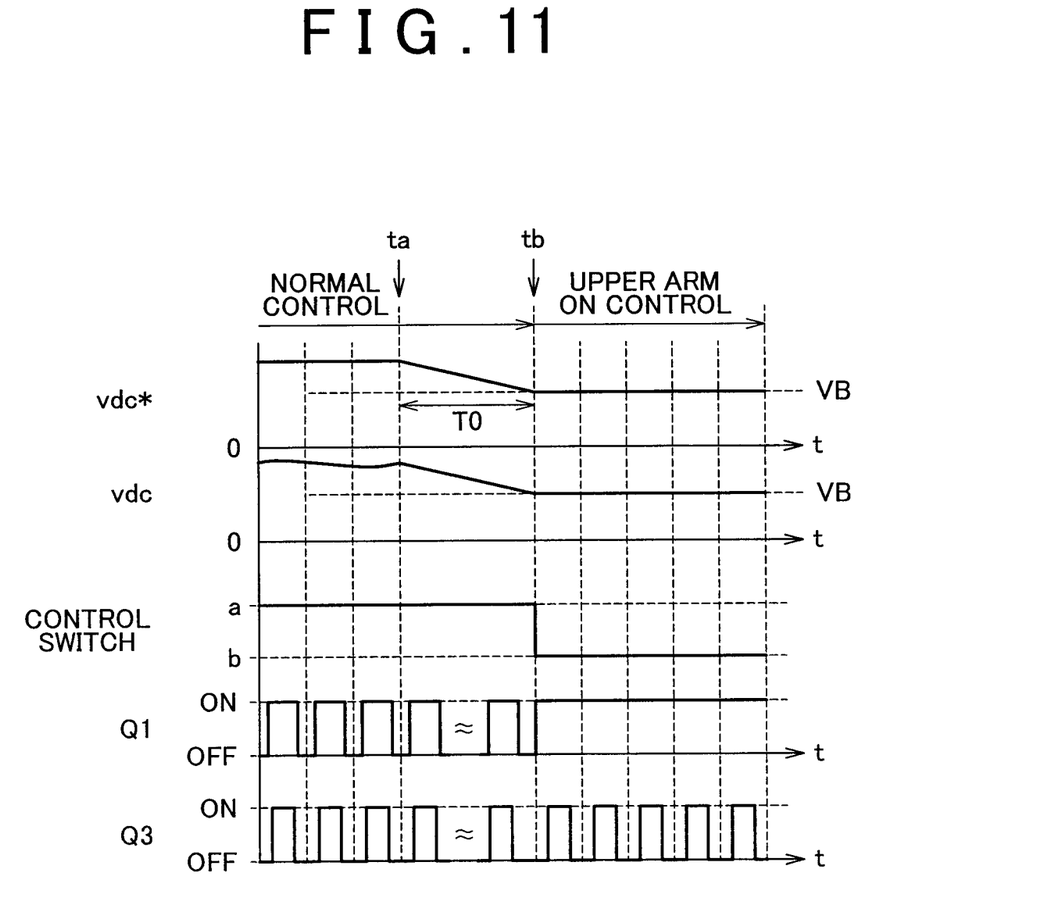
FIG. 11 is a waveform chart for illustrating a second example of control operation at the time of a change from the normal control mode to the upper arm ON control mode.

FIG. 11 is a waveform chart for illustrating a second example of control operation at the time of a change from the normal control mode to the upper arm ON control mode.

As shown in FIG. 11, as in the case of FIG. 10, until time ta at which the condition that upper arm ON control is applicable is satisfied, the normal control mode is applied. Furthermore, the standby period T0 is provided from time ta to time tb.

During the standby period T0, the AC-DC converter 250 and the DC-DC converter 210 are kept activated, and the normal control mode is applied. Then, the target voltage vdc* of the smoothing capacitor 220 gradually decreases to the battery voltage VB at that time. In the AC-DC converter 250, the on/off duty of the switching element Q3 is controlled so that the direct-current voltage vdc decreases with the target voltage vdc*. By so doing, by the time when the standby period T0 terminates, the direct-current voltage vdc decreases to the battery voltage VB.

From time tb, as in the case of FIG. 10, the upper arm ON control mode is applied. By so doing, the control switches 330 and 360 shown in FIG. 7 each are connected to the "b" side. Then, in the DC-DC converter 210, the switching element Q1 is kept in an on state. On the other hand, the AC-DC converter 250 generates charging current for charging the main battery 10 by converting the power supply voltage vac to direct-current voltage through on/off control over the switching element Q3.

By applying control for a change from the normal control mode to the upper arm ON control mode as shown in FIG. 11, as in the case of FIG. 10, inrush current that instantaneously occurs when the switching element Q1 is turned on may be suppressed at the time of a start of upper arm ON control. Furthermore, different from the change control shown in FIG. 10, it is not necessary to provide a discharging resistor for the smoothing capacitor 220, so the efficiency may be further improved.

Note that the standby period T0 shown in FIG. 10 and FIG. 11 may be terminated after a lapse of a constant period of time on the basis of a timer value, or the like, or may be terminated in response to the fact that it is detected that the direct-current voltage vdc has decreased to the battery voltage VB on the basis of a comparison of detected voltages.

In addition, the configuration of the charging device 200, particularly, the configuration of the AC-DC converter 250 and the configuration of the DC-DC converter 210, are not limited to the illustrated present embodiment. That is, as long as the AC-DC converter 250 is a non-isolated electric power converter that is able to convert the power supply voltage vac, supplied from the external power supply 500, to a direct-current voltage that is higher than the peak voltage of the power supply voltage, a circuit configuration different from the configuration of FIG. 1 may be applied to the AC-DC converter 250. In addition, as long as the DC-DC converter 210 is a non-isolated configuration that includes a switching element that is arranged so as to form a path that directly supplies current from the AC-DC converter 250 to the main battery 10 when the switching element is kept in an on state and is able to control charging current for charging the main battery 10 when the switching element is subjected to on/off control, a circuit configuration different from the configuration of FIG. 1 may be applied to the DC-DC converter 210.

The embodiment described above is illustrative and not restrictive in all respects. The scope of the invention is defined by the appended claims. The scope of the invention is intended to encompass all modifications within the scope of the appended claims and equivalents thereof.

The aspect of the invention may be applied to charging control when an electrical storage device equipped for an electromotive vehicle is charged by a power supply outside the vehicle.

The invention claimed is:

1. A charging device for an electromotive vehicle equipped with an electrical storage device, the charging device including: a first electric power converter that converts an alternating-current voltage, supplied from an external power supply, to a direct-current voltage higher than a peak voltage of the alternating-current voltage and outputs the direct-current voltage to a first power supply line; and a second electric power converter that, during external charging for charging the electrical storage device by the external power supply, converts a direct-current electric power between the first power supply line and a second power supply line that is electrically connected to a positive electrode of the electrical storage device, wherein:

the second electric power converter includes a first switching element that is electrically connected between a first node and the first power supply line, and a first inductor that is electrically connected between the first node and the second power supply line;

the charging device further includes a control device that controls the first and second electric power converters; and during the external charging, the control device selects either a first control mode in which the electrical storage device is charged through on/off control over the first switching element and a second control mode in which the electrical storage device is charged while the first switching element is kept in an on state, on the basis of a state of the external charging, wherein the control device selects the second control mode when a voltage of the electrical storage device is higher than the peak voltage of the alternating-current voltage.

2. The charging device according to claim 1, wherein the control device selects the second control mode when a charging electrical power for charging the electrical storage device is lower than a predetermined level.

3. The charging device according to claim 1, wherein the first electric power converter includes:
- a rectifier that rectifies the alternating-current voltage supplied from the external power supply and then outputs the rectified voltage to a third power supply line;
- a second inductor that is electrically connected between the third power supply line and a second node;
- a first diode that is electrically connected between the second node and the first power supply line so that a direction from the second node to the first power supply line is set as a forward direction; and
- a second switching element that is electrically connected between the second node and a fourth power supply line that is electrically connected to a negative electrode of the electrical storage device, and wherein the control device controls on/off states of the second switching element so that a current that passes through the second inductor coincides with a target current that is an absolute value of an alternating current of which a phase coincides with a phase of the alternating-current voltage, and the control device controls an amplitude of the target current on the basis of a voltage of the first power supply line in the first control mode; whereas the control device keeps the amplitude of the target current constant irrespective of the voltage of the first power supply line in the second control mode.

4. The charging device according to claim 1, wherein, in the first control mode, the control device controls a duty ratio of on/off states of the first switching element on the basis of a difference between a charging current for charging the electrical storage device and a target charging current.

5. The charging device according to claim 1, wherein, when the state of the external charging satisfies a predetei wined condition that the second control mode is applicable while the first control mode is selected, the control device changes from the first control mode to the second control mode after a voltage of the first power supply line has decreased to a voltage of the electrical storage device.

6. The charging device according to claim 5, wherein, when the state of the external charging satisfies the predetermined condition, the control device stops the first and second electric power converters and decreases the voltage of the first power supply line through discharging using a discharging resistor.

7. The charging device according to claim 5, wherein, when the state of the external charging satisfies the predetermined condition, the control device decreases a target voltage of the voltage of the first power supply line, supplied to the second electric power converter, to the voltage of the electrical storage device.

* * * * *